US011633993B2

(12) United States Patent
Kikuchi et al.

(10) Patent No.: US 11,633,993 B2
(45) Date of Patent: Apr. 25, 2023

(54) TIRE

(71) Applicant: Sumitomo Rubber Industries, Ltd., Hyogo (JP)

(72) Inventors: Hiroshi Kikuchi, Kobe (JP); Takuya Osawa, Kobe (JP); Hiroki Uno, Kobe (JP); Kentaro Yagyu, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 119 days.

(21) Appl. No.: 17/197,891

(22) Filed: Mar. 10, 2021

(65) Prior Publication Data

US 2021/0300128 A1 Sep. 30, 2021

(30) Foreign Application Priority Data

Mar. 24, 2020 (JP) ............................ JP2020-052090

(51) Int. Cl.

*B60C 19/08* (2006.01)
*B60C 15/00* (2006.01)
*B60C 15/06* (2006.01)

(52) U.S. Cl.

CPC ........ *B60C 19/086* (2013.01); *B60C 15/0009* (2013.01); *B60C 15/0036* (2013.01); *B60C 2015/009* (2013.01); *B60C 2015/0614* (2013.01)

(58) Field of Classification Search

CPC ............ B60C 15/0036; B60C 15/0009; B60C 2015/009; B60C 2015/0614; B60C 19/086

See application file for complete search history.

(56) References Cited

U.S. PATENT DOCUMENTS 6,082,423 A * 7/2000 Roesgen ................. B60C 13/00 152/533
2010/0181002 A1* 7/2010 Miyazaki ................ C08L 23/22 152/564
2013/0133811 A1* 5/2013 Inoue ..................... B29D 30/60 156/117
2014/0083591 A1* 3/2014 Ito .......................... B60C 15/05 152/541
2015/0298509 A1* 10/2015 Shimamura ......... B60C 15/0009 152/541
2020/0070593 A1* 3/2020 Mori ....................... B60C 13/02
2020/0122510 A1* 4/2020 Hata ...................... B29D 30/08

FOREIGN PATENT DOCUMENTS

EP 3354487 B1 * 7/2022 ......... B60C 15/0027
JP 2007008269 A 1/2007
JP 2017121908 A * 7/2017

* cited by examiner

*Primary Examiner* — Cedrick S Williams

(74) *Attorney, Agent, or Firm* — Studebaker & Brackett PC

(57) ABSTRACT

A tire 2 includes a tread 4, a pair of sidewalls 6, a pair of beads 10, a carcass 12, a belt 14, an inner liner 20, and a pair of insertion layers 22 disposed between the carcass 12 and the inner liner 20. Each insertion layer 22 is disposed between an end of the belt 14 and an end PB of the bead 10. Each insertion layer 22 has a volume resistivity of less than $10^8$ Ω·cm. A complex elastic modulus of the insertion layer 22 is equivalent to or higher than a complex elastic modulus of the inner liner 20. A thickness of each sidewall 6 at a maximum width position PW is not greater than 5.0 mm.

20 Claims, 4 Drawing Sheets

TIRE

BACKGROUND OF THE INVENTION

Field of the Invention

The present invention relates to a tire. More specifically, the present invention relates to a tire to be mounted to a passenger car.

Description of the Background Art

Tires are required to have low rolling resistance from an environmental viewpoint. For example, rubber having low-heat-generation properties is used in order to reduce rolling resistance. The rubber having low-heat-generation properties contains a large amount of silica as a reinforcing agent. Therefore, tires which use the rubber having low-heat-generation properties may cause reduction of electric conductivity and accumulation of static electricity generated during running Various examinations have been made in order to ensure electric conductivity even when rubber having low-heat-generation properties is used (for example, Japanese Laid-Open Patent Publication No. 2007-8269).

SUMMARY OF THE INVENTION

Topping rubber forming a part of a carcass in a tire has electric conductivity, and, therefore, the carcass functions as a conductive path. A tie gum layer is disposed between the carcass and an inner liner so as to be extended on and between one of beads and the other of the beads, similarly to the carcass. The tie gum layer has a volume resistivity of $10^8$ Ω·cm or higher, and does not function as a conductive path. If the tie gum layer is removed or reduced to reduce the thickness of a side portion of the tire, the rolling resistance may be expected to be reduced. However, since, during manufacturing of the tire, an unvulcanized tire (hereinafter, also referred to as green tire) is put in a mold and pressed against a cavity surface of the mold by an expanded bladder, the thickness required for the topping rubber may not be ensured, and the carcass may not function as the conductive path. Furthermore, in a case where a side portion is thin, steering stability may be degraded.

The present invention has been made in view of such circumstances, and an object of the present invention is to provide a tire that can reduce rolling resistance while reducing influence on electric conductivity and steering stability.

A tire according to one aspect of the present invention includes: a tread coming into contact with a road surface; a pair of sidewalls disposed inwardly of the tread in a radial direction so as to be continuous with ends of the tread; a pair of beads disposed inwardly of the sidewalls in the radial direction, the pair of beads having ring-shaped cores; a carcass extended on and between one of the beads and another of the beads so as to be disposed inwardly of the tread and the sidewalls; a belt disposed between the tread and the carcass in the radial direction; an inner liner disposed inwardly of the carcass; and a pair of insertion layers disposed between the carcass and the inner liner. The carcass includes a carcass ply. The carcass ply includes a ply body extended on and between one of the cores and another of the cores, and a pair of turned-up portions continuous with the ply body so as to be turned up around the cores, respectively, from an inner side toward an outer side in an axial direction. The insertion layers are each disposed between an end of the belt and an end of a corresponding one of the beads. The insertion layers each have a volume resistivity of less than $10^8$ Ω·cm. A complex elastic modulus of each insertion layer is equivalent to or higher than a complex elastic modulus of the inner liner. A thickness of each sidewall at a maximum width position is not greater than 5.0 mm.

In the tire, a ratio of the complex elastic modulus of each insertion layer to the complex elastic modulus of the inner liner is preferably not greater than 4.9.

In the tire, a thickness of each insertion layer is preferably not less than 0.2 mm and not greater than 1.0 mm.

In the tire, the complex elastic modulus of each insertion layer is preferably not less than 4.0 MPa.

In the tire, an outer end of each insertion layer is preferably disposed inwardly of the end of the belt in the axial direction, and an overlapping length over which each insertion layer and the belt overlap each other is preferably not greater than 20 mm.

In the tire, an inner end of each insertion layer is preferably disposed inwardly of the end of a corresponding one of the beads in the radial direction.

In the tire, an end of each turned-up portion is preferably disposed inwardly of the maximum width position in the radial direction.

In the tire, the carcass ply preferably includes multiple cords aligned with each other, and topping rubber covering the cords. A material of each insertion layer is preferably the same as a material of the topping rubber.

In the tire, the carcass preferably includes the one carcass ply. Each bead preferably includes an inner apex disposed outwardly of a corresponding one of the cores in the radial direction, and an outer apex disposed outwardly of the inner apex in the radial direction. Each turned-up portion is preferably disposed between the outer apex and the inner apex. An outer end of the outer apex preferably corresponds to the end of each bead.

According to the present invention, the tire that can reduce rolling resistance while reducing influence on electric conductivity and steering stability is obtained.

DESCRIPTION OF THE PREFERRED EMBODIMENTS

Figure 1:
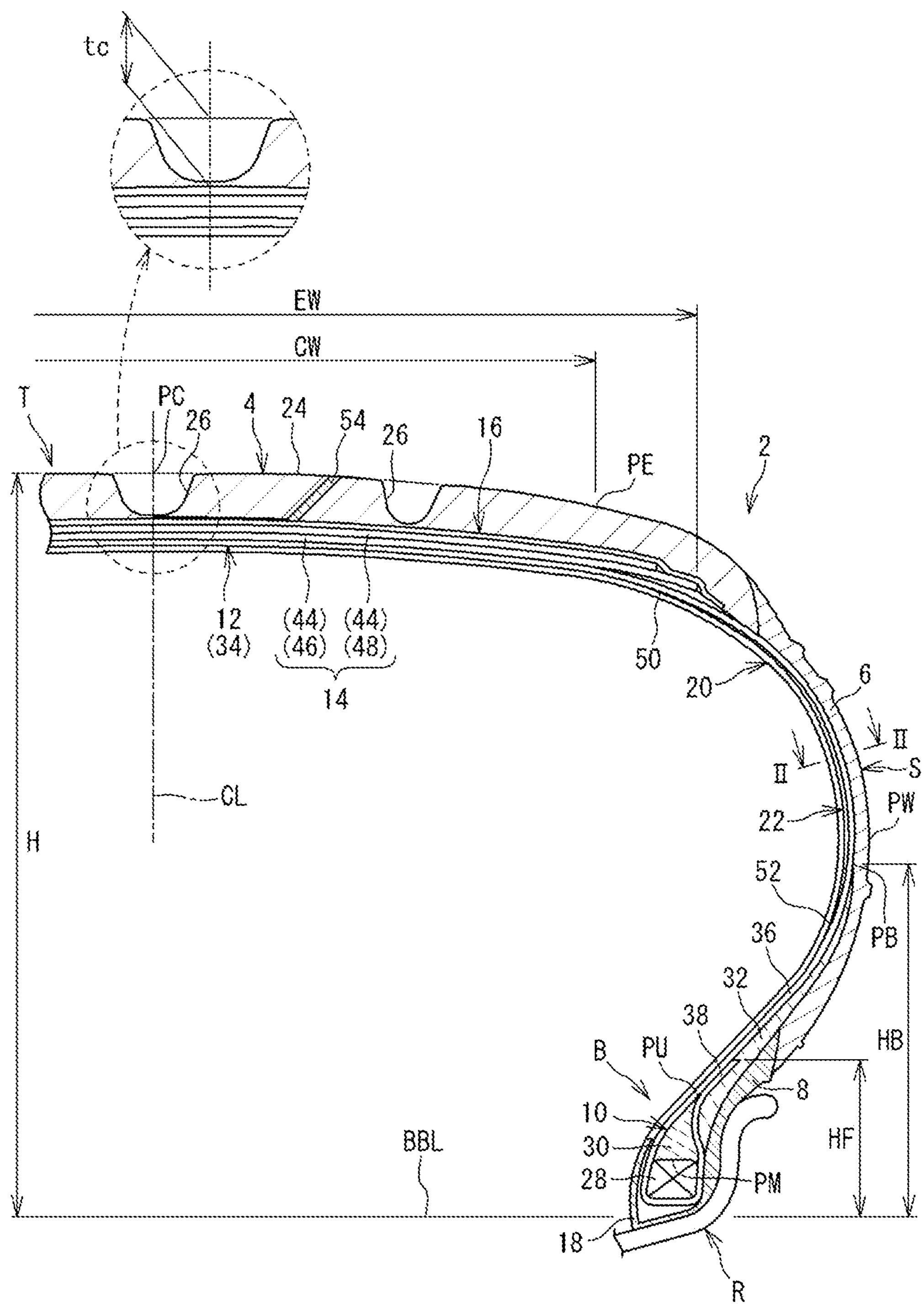
FIG. 1 is a cross-sectional view of a part of a tire according to one embodiment of the present invention.

The present invention will be described below in detail according to preferred embodiments with reference where appropriate to the drawings.

In the present disclosure, a state where a tire is mounted on a normal rim, has an internal pressure adjusted to a normal internal pressure, and is under no load is referred to as a normal state. In the present disclosure, unless otherwise specified, the dimensions and angles of each component of the tire are measured in the normal state.

The normal rim represents a rim that is defined by a standard with which the tire complies, and is, for example, the "standard rim" in the JATMA standard, the "Design Rim" in the TRA standard, and the "Measuring Rim" in the ETRTO standard.

The normal internal pressure represents an internal pressure that is defined by a standard with which the tire complies, and is, for example, the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard. The normal internal pressure of a tire for a passenger car is, for example, 180 kPa.

The normal load represents a load that is defined by a standard with which the tire complies, and is the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard. The normal load for a tire for a passenger car corresponds to, for example, 88% of the above-described load.

In the present disclosure, a side portion of the tire refers to a portion, of the tire, extending between a tread portion that comes into contact with a road surface, and a bead portion to be fitted onto a rim R.

In the present disclosure, a complex elastic modulus of a component, among components of the tire, formed of crosslinked rubber is measured by using a viscoelasticity spectrometer under the following conditions in compliance with the standard of JIS K6394.

Initial strain=10%

Amplitude=±1%

Frequency=10 Hz

Deformation mode=tension

Measurement temperature=70° C.

In the measurement, a test piece to be used is sampled from sheet-like crosslinked rubber (hereinafter, also referred to as rubber sheet) obtained by pressurizing and heating a rubber composition of each component. A commonly used press-forming machine is used to produce the rubber sheet. For producing the rubber sheet, a heating temperature is set to 165° C., and the heating time is set to 10 minutes.

In the present disclosure, a volume resistivity of the component, among the components of the tire, formed of crosslinked rubber is measured at an applied voltage of 1000 V under a constant temperature and humidity condition in which the temperature is 23° C. and the relative humidity is 55% with the other conditions being in compliance with the standard of JIS K6271. A rubber sheet to be used in the measurement is produced in the same manner as for the above-described rubber sheet.

In the present disclosure, the crosslinked rubber refers to a molded product of a rubber composition obtained by pressurizing and heating the rubber composition. The rubber composition is unvulcanized rubber obtained by mixing base rubber and chemicals in a kneading machine such as a Banbury mixer. The crosslinked rubber is also referred to as vulcanized rubber, and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile butadiene rubber (NBR), and isobutylene-isoprene-rubber (IIR). Examples of the chemicals include a reinforcing agent such as carbon black and silica, a plasticizer such as aromatic oil, a filler such as zinc oxide, a lubricant such as stearic acid, an antioxidant, a processing aid, sulfur, and a vulcanization accelerator. Selection of the base rubber and the chemicals, contents of the selected chemicals, and the like are determined as appropriate according to the specifications of the component to which the rubber composition is applied, which is not described in detail.

FIG. 1 illustrates a part of a tire 2 according to one embodiment of the present invention. The tire 2 is mounted to a passenger car. In FIG. 1, the tire 2 is mounted on the rim R (normal rim) and is in the normal state. The tire 2 is a pneumatic tire.

FIG. 1 illustrates a part of a cross-section of the tire 2 along a plane including the rotation axis of the tire 2. In FIG. 1, the left-right direction represents the axial direction of the tire 2, and the up-down direction represents the radial direction of the tire 2. The direction perpendicular to the surface of the drawing sheet in FIG. 1 represents the circumferential direction of the tire 2. In FIG. 1, an alternate long and short dash line CL represents the equator plane of the tire 2.

In FIG. 1, a solid line BBL extending in the axial direction represents a bead base line. A rim diameter (see, for example, JATMA) of the rim R is defined by the bead base line.

In FIG. 1, reference character PW represents an outer end of the tire 2 in the axial direction. A distance in the axial direction from one outer end PW to the other outer end PW is a maximum width of the tire 2, that is, a cross-sectional width (see, for example, JATMA). The outer end PW represents a position (hereinafter, referred to as maximum width position) at which the tire 2 has the maximum width. The outer end PW is defined based on the contour of the outer surface of the tire 2. In a case where a decorative portion such as a pattern or a character is on the outer surface, the outer end PW is defined based on a contour of an imaginary outer surface obtained on the assumption that the decorative portion is not provided.

Figure 2:
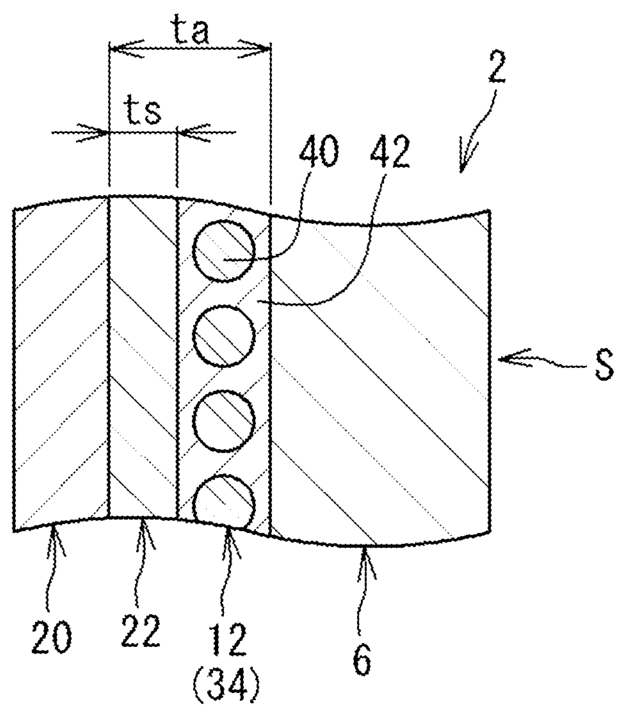
FIG. 2 is a cross-sectional view taken along a line II-II in FIG. 1.

FIG. 2 illustrates a cross-section of the tire 2 taken along a line II-II in FIG. 1. On the surface of the drawing sheet in FIG. 2, the right side represents the outer surface side of the tire 2 and the left side represents the inner surface side of the tire 2.

The tire 2 includes a tread 4, a pair of sidewalls 6, a pair of clinches 8, a pair of beads 10, a carcass 12, a belt 14, a band 16, a pair of chafers 18, an inner liner 20, and a pair of insertion layers 22.

The tread 4 comes into contact with a road surface at the outer surface, that is, a tread surface 24. The tread 4 has grooves 26 formed therein. The tread 4 is formed of crosslinked rubber obtained in consideration of wear resistance, grip performance, and the like.

In FIG. 1, reference character PC represents an intersection point at which the tread surface 24 and the equator plane intersect each other. The intersection point PC represents the equator of the tire 2. In a case where the groove 26 is disposed at the equator plane, the equator PC is defined based on the contour of an imaginary tread surface obtained on assumption that the groove 26 is not disposed. A double-headed arrow H represents a distance in the radial direction from the bead base line to the equator PC. The distance H in the radial direction is a cross-sectional height (see, for example, JATMA) of the tire 2.

In FIG. 1, a double-headed arrow tc represents a thickness of the tread 4. The thickness tc is represented by a distance, measured along the equator plane, from the inner surface of the tread to the equator PC.

In the tire 2, the thickness tc of the tread is preferably not greater than 8.5 mm, more preferably not greater than 8.0 mm, and even more preferably not greater than 7.5 mm, from the viewpoint of weight reduction. The thickness tc is preferably not less than 5.0 mm, more preferably not less than 5.5 mm, and even more preferably not less than 6.0 mm, from the viewpoint that the tread can fully exhibit its function.

The sidewalls 6 are continuous with ends of the tread 4. Each sidewall 6 is disposed inwardly of the tread 4 in the radial direction. The sidewall 6 extends from the end of the tread 4 toward the clinch 8. The sidewall 6 is formed of crosslinked rubber obtained in consideration of cut resistance.

Each clinch 8 is disposed inwardly of the sidewall 6 in the radial direction. The clinch 8 comes into contact with the rim R. The clinch 8 is formed of crosslinked rubber obtained in consideration of wear resistance. The clinch 8 has a volume resistivity of less than $10^8$ Ω·cm. The clinch 8 functions as a conductive path.

Each bead 10 is disposed inwardly of the clinch 8 in the axial direction. As described above, the clinch 8 is disposed inwardly of the sidewall 6 in the radial direction. The bead 10 is disposed inwardly of the sidewall 6 in the radial direction. In FIG. 1, reference character PB represents an end of the bead 10.

Each bead 10 includes a core 28, an inner apex 30, and an outer apex 32. The core 28 is ring-shaped. The core 28 includes a steel wire. The inner apex 30 is formed of crosslinked rubber having a high stiffness. The outer apex 32 is formed of crosslinked rubber having a high stiffness. In the tire 2, the outer apex 32 may be formed of the same material as that of the inner apex 30, or may be formed of a material different from that of the inner apex 30.

The inner apex 30 is disposed outwardly of the core 28 in the radial direction. The inner apex 30 is tapered outwardly in the radial direction. The height of the inner apex 30 is not less than 5 mm and not greater than 20 mm. The height of the inner apex 30 is represented by a distance to an end PU of the inner apex 30 from a center of a boundary, represented by reference character PM, between the core 28 and the inner apex 30.

The outer apex 32 is disposed outwardly of the inner apex 30 in the radial direction. The outer apex 32 is disposed between the carcass 12 and the clinch 8. A turned-up portion of a carcass ply described below is disposed between the outer apex 32 and the inner apex 30. In the tire 2, the outer apex 32 is thick near the end PU of the inner apex 30, and is tapered inwardly from the thick portion in the radial direction and is tapered outwardly from the thick portion in the radial direction.

In the tire 2, an inner end of the outer apex 32 is disposed near a boundary between the core 28 and the inner apex 30. In the radial direction, an outer end of the outer apex 32 is disposed near the maximum width position PW. In the tire 2, the outer end of the outer apex 32 is the end PB of the bead 10.

In FIG. 1, a length represented by a double-headed arrow HB is a distance in the radial direction from the bead base line to the end PB of the bead 10. The distance HB is also referred to as a bead height. In the tire 2, a ratio (HB/H) of the bead height HB to the cross-sectional height H is preferably not less than 0.35 and more preferably not less than 0.39 from the viewpoint of steering stability and ride comfort. The ratio (HB/H) is preferably not greater than 0.50 and more preferably not greater than 0.46.

In the tire 2, each of the inner apex 30 and the outer apex 32 has a volume resistivity of less than $10^8$ Ω·cm. The bead 10 of the tire 2 functions as a conductive path.

The carcass 12 is disposed inwardly of the tread 4, the pair of sidewalls 6, and the pair of clinches 8. The carcass 12 is extended on and between one of the beads 10 and the other of the beads 10. The carcass 12 has a radial structure. The carcass 12 includes at least one carcass ply 34.

In the tire 2, the carcass 12 has one carcass ply 34. The carcass ply 34 is turned up around each core 28 from the inner side toward the outer side in the axial direction. The carcass ply 34 includes a ply body 36 extended on and between one of the cores 28 and the other of the cores 28, and a pair of turned-up portions 38 that are continuous with the ply body 36 and are turned up around the respective cores 28 from the inner side toward the outer side in the axial direction.

In the tire 2, an end of the turned-up portion 38, that is, an end of the carcass ply 34 is disposed inwardly of the maximum width position PW in the radial direction. The carcass 12 has a low turned-up (LTU) structure. As shown in FIG. 1, in the tire 2, the end of the turned-up portion 38 is disposed between the outer apex 32 and the ply body 36.

In FIG. 1, a length represented by a double-headed arrow HF is a distance in the radial direction from the bead base line to the end of the turned-up portion 38. The distance HF is also referred to as a turned-up portion height. In the tire 2, a ratio (HF/H) of the turned-up portion height HF to the cross-sectional height H is preferably not less than 0.18 and more preferably not less than 0.20, from the viewpoint of steering stability and ride comfort. The ratio (HF/H) is preferably not greater than 0.25 and more preferably not greater than 0.23.

The carcass ply 34 includes multiple carcass cords 40 aligned with each other. Each of the carcass cords 40 intersects the equator plane, which is not shown. In the tire 2, cords formed of an organic fiber are used as the carcass cords 40. Examples of the organic fiber include nylon fibers, rayon fibers, polyester fibers, and aramid fibers.

As shown in FIG. 2, the carcass cords 40 are covered with topping rubber 42. In the tire 2, the topping rubber 42 has a volume resistivity of less than $10^8$ Ω·cm. The carcass 12 including the topping rubber 42 functions as a conductive path.

The belt 14 is disposed between the tread 4 and the carcass 12 in the radial direction. The belt 14 is layered over the carcass 12 in a portion inward of the tread 4 in the radial direction. The belt 14 includes at least two layers 44 layered over each other in the radial direction. One, of the layers 44 of the belt 14, having the largest width is a first layer 46. The layer 44 that is disposed outwardly of the first layer 46 in the radial direction and that has the second largest width next to the first layer 46 is a second layer 48.

In the tire 2, the belt 14 includes two layers 44. In the tire 2, the layer 44, among the two layers 44, disposed on the inner side is the first layer 46, and the layer 44, among the two layers 44, disposed on the outer side is the second layer 48. The belt 14 includes the first layer 46, and the second layer 48 disposed outwardly of the first layer 46 in the radial direction. The width of the first layer 46 is greater than the width of the second layer 48.

Each of the first layer 46 and the second layer 48 incudes multiple belt cords aligned with each other, which is not shown. The belt cords are covered with topping rubber. Each of the belt cords is inclined relative to the equator plane. A material of the belt cords is steel. The topping rubber has a volume resistivity of less than $10^8$ Ω·cm. The belt 14 functions as a conductive path.

In FIG. 1, a length represented by a double-headed arrow EW is a width of the belt 14. The width of the belt 14 is represented by a distance in the axial direction from one end of the belt 14 to the other end of the belt 14. In FIG. 1, reference character PE represents a position (hereinafter, also referred to as ground contact reference position), on the outer surface of the tread 4, corresponding to each axial outer end of a ground contact surface (not shown) at which the tire 2 comes into contact with a road surface. The ground contact reference position PE is defined based on a ground contact surface obtained when the tire 2 in the normal state is brought into contact with a flat road surface at a camber angle of 0° under the normal load. In FIG. 1, a length represented by a double-headed arrow CW is a distance in the axial direction from one of the ground contact reference positions PE to the other of the ground contact reference positions PE. In the tire 2, the distance CW is referred to as a reference ground contact width.

In the tire 2, from the viewpoint that the belt 14 contributes to assuredly obtaining stiffness of a tread portion T, a ratio (EW/CW) of the width EW of the belt 14 to the reference ground contact width CW is preferably not less than 1.10 and more preferably not less than 1.15. From the viewpoint of reducing influence of the belt 14 on the mass and rolling resistance, and preventing damage to the end of the belt 14, the ratio (EW/CW) is preferably not greater than 1.30 and more preferably not greater than 1.25.

The band 16 is disposed inwardly of the tread 4 in the radial direction. The band 16 is disposed between the tread 4 and the belt 14 in the radial direction. In the tire 2, an end of the band 16 is disposed outwardly of the end of the belt 14 in the axial direction. The band 16 is a full band covering the entirety of the belt 14. The band 16 may further include a pair of edge bands covering end portions of the full band. The band 16 may be formed as a pair of edge bands instead of the full band. In this case, the edge bands cover the end portions of the belt 14.

The band 16 includes a band cord, which is not shown. In the band 16, the band cord is helically wound in the circumferential direction. The band cord is covered with topping rubber. A cord formed of an organic fiber is used as the band cord. Examples of the organic fiber include nylon fibers, rayon fibers, polyester fibers, and aramid fibers. The topping rubber has a volume resistivity of less than $10^8$ Ω·cm. The band 16 functions as a conductive path.

Each chafer 18 is disposed inwardly of the bead 10 in the radial direction. The chafer 18 comes into contact with the rim R. In the tire 2, the chafer 18 includes a fabric and rubber impregnated in the fabric.

The inner liner 20 is disposed inwardly of the carcass 12. The inner liner 20 forms the inner surface of the tire 2. The inner liner 20 is formed of crosslinked rubber having a low gas permeation coefficient. The inner liner 20 maintains the internal pressure of the tire 2.

Each insertion layer 22 is disposed between the carcass 12 and the inner liner 20. The insertion layer 22 is disposed between the end of the belt 14 and the end PB of the bead 10. In the tire 2, the position of an outer end 50 of the insertion layer 22 coincides with the position of the end of the belt 14 in the axial direction, or the outer end 50 of the insertion layer 22 is disposed inwardly of the end of the belt 14 in the axial direction. An inner end 52 of the insertion layer 22 is disposed inwardly of the end PB of the bead 10 in the radial direction. The insertion layer 22 is formed of crosslinked rubber obtained in consideration of electric conductivity and stiffness.

In the tire 2, at portions having the insertion layers 22 disposed therein, the inner liner is joined to the carcass via the insertion layers 22. The inner liner 20 is joined directly to the carcass 12, at a portion at which the insertion layers 22 are not disposed, such as a portion between the outer end 50 of one of the insertion layers 22 and the outer end 50 of the other of the insertion layers 22, and portions located inwardly of the inner ends 52 of the insertion layers 22.

In the tire 2, a conductive portion 54 having a volume resistivity of less than $10^8$ Ω·cm is provided in the tread 4 so as to penetrate through the tread 4. In the tire 2, the conductive path is formed by the clinches 8, the beads 10, the carcass 12, the belt 14, the band 16, and the conductive portion 54. A vehicle having the tire 2 mounted thereto is electrically connected to a road surface by the conductive path.

Figure 3:
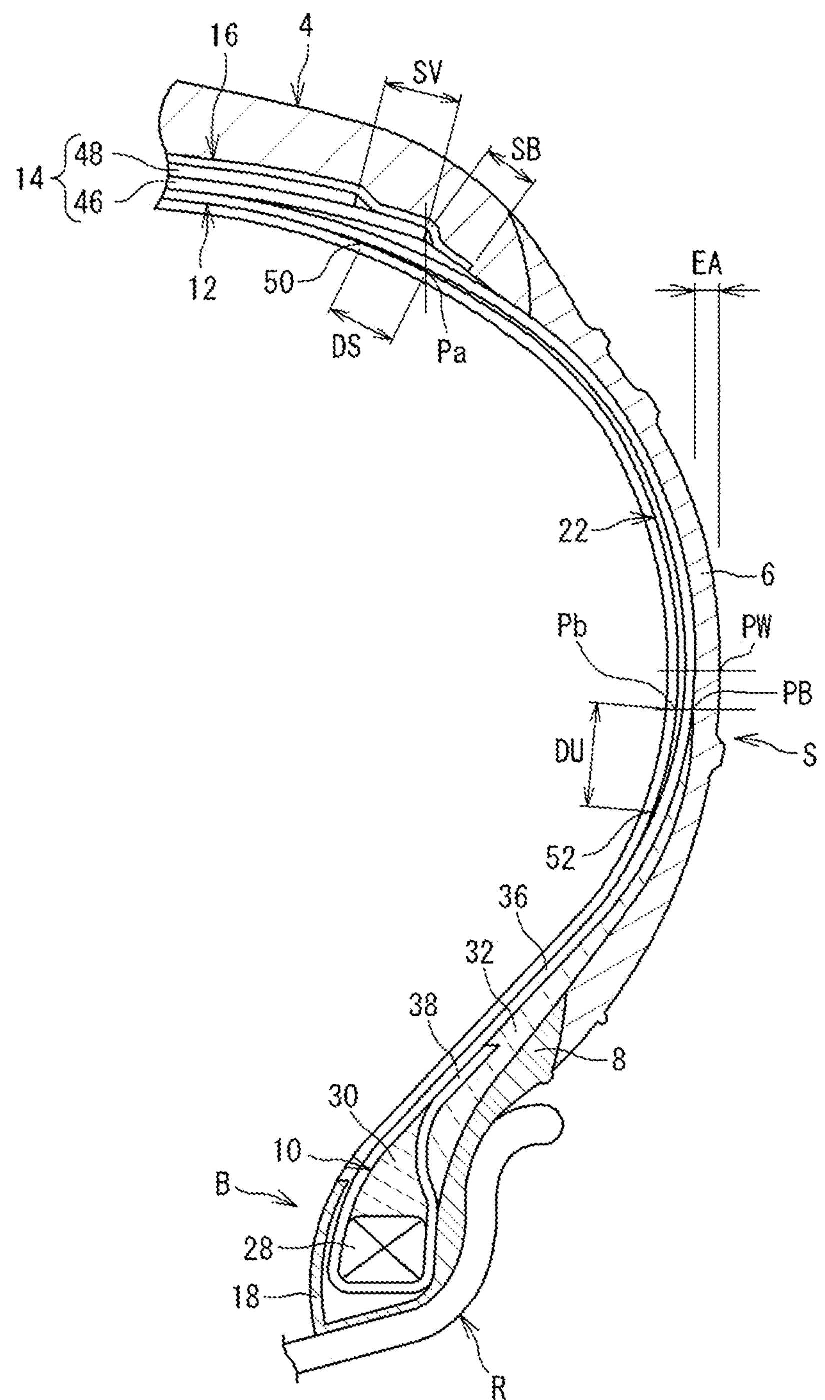
FIG. 3 is an enlarged cross-sectional view of a part of the tire shown in FIG. 1.

FIG. 3 illustrates a part of the cross-section of the tire 2 shown in FIG. 1. FIG. 3 shows a side portion S of the tire 2. In FIG. 3, the left-right direction represents the axial direction of the tire 2, and the up-down direction represents the radial direction of the tire 2. The direction perpendicular to the surface of the drawing sheet in FIG. 3 represents the circumferential direction of the tire 2.

In FIG. 3, a length represented by a double-headed arrow EA is a thickness of the sidewall 6. The thickness EA is represented by a distance, from the inner surface of the sidewall 6 to the outer surface thereof, measured along a straight line extending through the maximum width position PW in the axial direction. The thickness EA is a thickness of the sidewall 6 at the maximum width position PW.

In the tire 2, the thickness EA of the sidewall 6 at the maximum width position PW is not greater than 5.0 mm. In the tire 2, the side portion S is thin. The thin side portion S contributes to reduction of a mass and rolling resistance of the tire. From this viewpoint, the thickness EA is preferably not greater than 4.9 mm and more preferably not greater than 4.8 mm From the viewpoint of preventing damage to the side portion S, the thickness EA is preferably not less than 1.0 mm, more preferably not less than 1.1 mm, and even more preferably not less than 1.2 mm.

In a conventional tire, an inner liner is joined to a carcass via a tie gum layer, which is not shown. Meanwhile, in the tire 2, the inner liner 20 is joined to the carcass 12 without using a tie gum layer. The tire 2 has a weight lighter than a conventional tire having the tie gum layer. Rolling resistance of the tire 2 is lower than that of the conventional tire.

For producing the tire 2, components such as the tread 4 in an unvulcanized state are combined to prepare an unvulcanized tire (hereinafter, also referred to as green tire). The green tire is pressurized and heated in a mold (not shown).

For producing the tire 2, in the pressurizing and heating process step (hereinafter, also referred to as vulcanization process step), the green tire is pressed against a cavity surface of the mold by an expanded bladder, which is not shown. In a zone from a portion near the end of the tread 4 to the maximum width position PW, the green tire is strongly pressed by the bladder, and intrusion of the inner liner 20 into the topping rubber 42 forming a part of the carcass 12 may occur. In this case, the topping rubber 42 is squeezed and a required thickness cannot be ensured, so that the carcass 12 may not function as the conductive path.

However, as described above, in the tire 2, the insertion layer 22 between the carcass 12 and the inner liner 20 is disposed between the end of the belt 14 and the end PB of the bead 10. A volume resistivity of the insertion layer 22 is less than $10^8$ Ω·cm, and a complex elastic modulus E*s of the insertion layer 22 is equivalent to a complex elastic modulus E*n of the inner liner 20 or higher than the complex elastic modulus E*n of the inner liner 20.

In the tire 2, the complex elastic modulus E*s of the insertion layer 22 is equivalent to or higher than the complex elastic modulus E*n of the inner liner 20, thereby inhibiting the inner liner 20 from moving due to pressing by the bladder. In the tire 2, intrusion of the inner liner 20 into the topping rubber 42 is prevented. Also in the above-described zone in which the topping rubber 42 may be squeezed, the thickness of the topping rubber 42 is ensured, so that the carcass 12 can function as the conductive path. The distance between the carcass cords 40 is appropriately maintained without expanding, thereby reducing generation of a defect such as open thread. The insertion layer 22 is formed of crosslinked rubber having electric conductivity, similarly to the topping rubber 42. Therefore, even if intrusion of the insertion layer 22 into the topping rubber 42 occurs, the carcass 12 can function as the conductive path.

Furthermore, the complex elastic modulus E*s of the insertion layer 22 is equivalent to or higher than the complex elastic modulus E*n of the inner liner 20, whereby the insertion layer 22 contributes to assuredly obtaining stiffness of the tire 2. In the tire 2, although the side portion S is thin, good steering stability is obtained.

The tire 2 can reduce rolling resistance while reducing influence on electric conductivity and steering stability.

For example, as shown in FIG. 2, the insertion layer 22 is in contact with the topping rubber 42 of the carcass 12. From the viewpoint of forming a stable conductive path, the insertion layer 22 is preferably formed of the same material as that of the topping rubber 42.

In FIG. 2, a length represented by a double-headed arrow ts is a thickness of the insertion layer 22. A length represented by a double-headed arrow ta is a thickness of a portion including the insertion layer 22 and the carcass 12. In FIG. 1, the line II-II passes through a position at which the thickness ta is largest. The thickness ta represents the largest thickness of the portion including the insertion layer 22 and the carcass 12. The thickness ts of the insertion layer 22 represents a thickness of the insertion layer 22 at a position at which the portion including the insertion layer 22 and the carcass 12 has the largest thickness.

In the tire 2, from the viewpoint that the insertion layer 22 can contribute to assuredly obtaining the thickness of the topping rubber 42 and the stiffness of the tire 2, the thickness ts of the insertion layer 22 is preferably not less than 0.2 mm, more preferably not less than 0.3 mm, and even more preferably not less than 0.4 mm. From the viewpoint of effectively reducing influence of the insertion layer 22 on the mass and rolling resistance of the tire 2, the thickness ts is preferably not greater than 1.0 mm, more preferably not greater than 0.9 mm, and even more preferably not greater than 0.8 mm.

In the tire 2, from the viewpoint that the portion including the insertion layer 22 and the carcass 12 can contribute to assuredly obtaining electric conductivity and steering stability, the thickness ta is preferably not less than 0.8 mm, more preferably not less than 0.9 mm, and even more preferably not less than 1.0 mm. From the viewpoint of effectively reducing influence of the portion including the insertion layer 22 and the carcass 12 on the mass and rolling resistance of the tire 2, the thickness ta is preferably not greater than 2.0 mm, more preferably not greater than 1.9 mm, and even more preferably not greater than 1.8 mm.

In the tire 2, a ratio (E*s/E*n) of the complex elastic modulus E*s of the insertion layer 22 to the complex elastic modulus E*n of the inner liner 20 is preferably not greater than 4.9.

Since the ratio (E*s/E*n) is set to be not greater than 4.9, influence of the insertion layer 22 on ride comfort is reduced. From this viewpoint, the ratio (E*s/E*n) is more preferably not greater than 3.5 and even more preferably not greater than 2.0.

As described above, in the tire 2, the complex elastic modulus E*s of the insertion layer 22 is equivalent to or higher than the complex elastic modulus E*n of the inner liner 20, and the insertion layer 22 contributes to assuredly obtaining electric conductivity of the tire 2 and improving steering stability. From this viewpoint, the ratio (E*s/E*n) is preferably not less than 1.1, more preferably not less than 1.3, and even more preferably not less than 1.5.

In the tire 2, the complex elastic modulus E*s of the insertion layer 22 is preferably not less than 4.0 MPa. Thus, the insertion layer 22 can effectively contribute to assuredly obtaining electric conductivity of the tire 2 and improving steering stability. From this viewpoint, the complex elastic modulus E*s of the insertion layer 22 is more preferably not less than 4.5 MPa and even more preferably not less than 5.4 MPa. From the viewpoint of obtaining good ride comfort, the complex elastic modulus E*s of the insertion layer 22 is preferably not greater than 7.0 MPa, more preferably not greater than 6.7 MPa, and even more preferably not greater than 6.5 MPa.

In FIG. 3, a position represented by reference character Pa is an intersection point of an inner surface of the insertion layer 22 and a straight line extending through the end of the belt 14 in the radial direction. The position Pa is a position, on the inner surface, corresponding to the end of the belt 14. A length represented by a double-headed arrow DS is a distance from the position Pa to the outer end 50 of the insertion layer 22. In the tire 2, the distance DS is an overlapping length over which the insertion layer 22 and the belt 14 overlap each other.

In the tire 2, the outer end 50 of the insertion layer 22 is preferably disposed inwardly of the end of the belt 14 in the axial direction, and the overlapping length DS over which the insertion layer 22 and the belt 14 overlap each other is not greater than 20 mm. Thus, influence of the insertion layer 22 on the mass and rolling resistance of the tire 2 is effectively reduced. From this viewpoint, the overlapping length DS is more preferably not greater than 10 mm and even more preferably not greater than 7 mm. From the viewpoint of assuredly obtaining electric conductivity of the tire 2, the overlapping length DS is preferably not less than 1 mm, more preferably not less than 2 mm, and even more preferably not less than 3 mm.

In FIG. 3, a position represented by reference character Pb is an intersection point of the inner surface of the insertion layer 22 and a straight line extending through the end PB of the bead 10 in the axial direction. The position Pb is a position, on the inner surface, corresponding to the end PB of the bead 10. A length represented by a double-headed arrow DU is a distance from the position Pb to the inner end 52 of the insertion layer 22. In the tire 2, the distance DU is an overlapping length over which the bead 10 and the insertion layer 22 overlap each other.

In the tire 2, the overlapping length DU over which the bead 10 and the insertion layer 22 overlap each other is preferably not greater than 30 mm. Thus, influence of the insertion layer 22 on the mass and rolling resistance of the tire 2 is effectively reduced. From this viewpoint, the overlapping length DU is more preferably not greater than 20 mm and even more preferably not greater than 15 mm. From the viewpoint of assuredly obtaining electric conductivity and steering stability of the tire 2, the overlapping length DS is preferably not less than 1 mm, more preferably not less than 3 mm, and even more preferably not less than 5 mm.

In FIG. 3, a double-headed arrow SV represents a shortest distance from an end of the second layer 48 to an end of the first layer 46. The distance SV represents the length of projection of the first layer 46 from the second layer 48, and is also referred to as a first step distance. A double-headed arrow SB represents a shortest distance from the end of the first layer 46 to an end of the band 16. The distance SB represents the length of projection of the band 16 from the first layer 46, and is also referred to as a second step distance.

In the tire 2, the end of the first layer 46 is disposed outwardly of the end of the second layer 48 in the axial direction, and the end of the band 16 is disposed outwardly of the end of the first layer 46 in the axial direction. In the tire 2, the end of the first layer 46, the end of the second layer 48, and the end of the band 16 are disposed in a dispersed manner in the axial direction. This disposition gently changes a holding force at the end portions of the belt 14 and the band 16, thereby reducing concentration of strain on the end portions. In the tire 2, generation of damage at the end portions is prevented and wear resistance is also improved.

In the tire 2, from the viewpoint of preventing generation of damage at the end portions, reducing rolling resistance, and improving wear resistance, the first step distance SV is preferably not less than 5.0 mm, more preferably not less than 5.5 mm, and even more preferably not less than 6.0 mm. From the viewpoint of assuredly obtaining the holding force by the belt 14 and obtaining good steering stability, the first step distance SV is preferably not greater than 9.0 mm, more preferably not greater than 8.5 mm, and even more preferably not greater than 8.0 mm.

In the tire 2, from the viewpoint of preventing generation of damage at the end portions, and improving wear resistance, the second step distance SB is preferably not less than 4.0 mm, more preferably not less than 4.5 mm, and even more preferably not less than 4.8 mm. From the viewpoint of reducing influence of the band 16 on the mass and rolling resistance of the tire, and sufficiently ensuring a distance from the end of the band 16 to the outer surface of the tire 2, the second step distance SB is preferably not greater than 6.0 mm, more preferably not greater than 5.5 mm, and even more preferably not greater than 5.2 mm.

Figure 4:
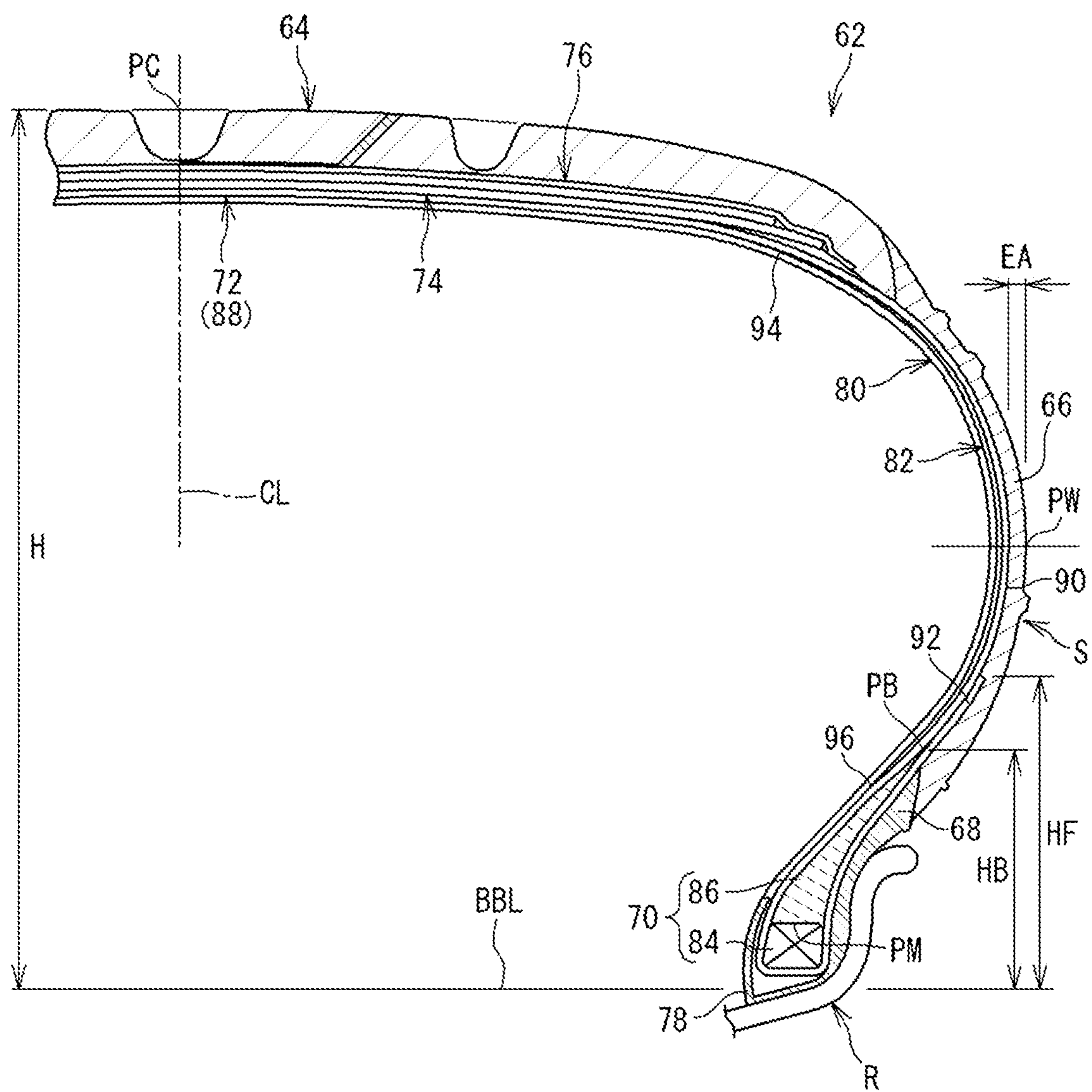
FIG. 4 is a cross-sectional view of a part of a tire according to another embodiment of the present invention.

FIG. 4 illustrates a part of a tire 62 according to another embodiment of the present invention. The tire 62 is mounted to a passenger car. In FIG. 4, the tire 62 is mounted on the rim R (normal rim) and is in the normal state.

FIG. 4 illustrates a part of a cross-section of the tire 62 along a plane including the rotation axis of the tire 62. In FIG. 4, the left-right direction represents the axial direction of the tire 62, and the up-down direction represents the radial direction of the tire 62. The direction perpendicular to the surface of the drawing sheet in FIG. 4 represents the circumferential direction of the tire 62.

The tire 62 includes a tread 64, a pair of sidewalls 66, a pair of clinches 68, a pair of beads 70, a carcass 72, a belt 74, a band 76, a pair of chafers 78, an inner liner 80, and a pair of insertion layers 82. The tire 62 has the same structure as the tire 2 shown in FIG. 1 except for the beads 70 and the carcass 72.

Also in the tire 62, each bead 70 is disposed inwardly of the sidewall 66 in the radial direction. In FIG. 4, reference character PB represents an end of the bead 70.

Each bead 70 includes a core 84 and an apex 86. The core 84 is ring-shaped. The core 84 includes a steel wire. The apex 86 is formed of crosslinked rubber having a high stiffness. In the tire 62, the apex 86 has a volume resistivity of less than $10^8$ Ω·cm. The beads 70 function as a conductive path.

The apex 86 is disposed outwardly of the core 84 in the radial direction. The apex 86 is tapered outwardly in the radial direction. The height of the apex 86 is not less than 20 mm and not greater than 45 mm. The height of the apex 86 is represented by a distance to an end of the apex 86 from a center of a boundary, represented by reference character PM, between the core 84 and the apex 86. In the tire 62, each bead 70 includes the core 84 and the apex 86. The end of the apex 86 is the end PB of the bead 70.

In FIG. 4, a length represented by a double-headed arrow HB is a bead height. In the tire 62, from the viewpoint of steering stability and ride comfort, a ratio (HB/H) of the bead height HB to the cross-sectional height H is preferably not less than 0.20 and more preferably not less than 0.25. The ratio (HB/H) is preferably not greater than 0.35 and more preferably not greater than 0.30.

The carcass 72 is disposed inwardly of the tread 64, the pair of sidewalls 66, and the pair of clinches 68. The carcass 72 is extended on and between one of the beads 70 and the other of the beads 70. The carcass 72 has a radial structure. The carcass 72 includes at least one carcass ply 88.

In the tire 62, the carcass 72 has one carcass ply 88. The carcass ply 88 is turned up around each core 84 from the inner side toward the outer side in the axial direction. The carcass ply 88 includes a ply body 90 extended on and between one of the cores 84 and the other of the cores 84, and a pair of turned-up portions 92 that are continuous with the ply body 90 and are turned up around the respective cores 84 from the inner side toward the outer side in the axial direction.

As shown in FIG. 4, also in the tire 62, an end of the turned-up portion 92, that is, an end of the carcass ply 88 is disposed inwardly of the maximum width position PW in the radial direction. The carcass 72 has a low turned-up (LTU) structure. In the tire 62, the end of the turned-up portion 92 is disposed outwardly of the end PB of the bead 70 in the radial direction.

In FIG. 4, a length represented by a double-headed arrow HF is a turned-up portion height. In the tire 62, from the viewpoint of steering stability and ride comfort, a ratio (HF/H) of the turned-up portion height HF to the cross-sectional height H is preferably not less than 0.25 and more preferably not less than 0.30. The ratio (HF/H) is preferably not greater than 0.45 and more preferably not greater than 0.40.

The carcass ply 88 includes multiple carcass cords aligned with each other, which is not shown. Each of the carcass cords intersects the equator plane. In the tire 62, cords formed of an organic fiber are used as the carcass cords. Examples of the organic fiber include nylon fibers, rayon fibers, polyester fibers, and aramid fibers.

Also in the tire 62, the carcass cords are covered with topping rubber. The topping rubber has a volume resistivity of less than $10^8$ Ω·cm. The carcass 72 including the topping rubber functions as a conductive path.

Also in the tire 62, each insertion layer 82 is disposed between the carcass 72 and the inner liner 80. The insertion layer 82 is disposed between an end of the belt 74 and the end PB of the bead 70. In the tire 62, an outer end 94 of the insertion layer 82 is disposed inwardly of the end of the belt 74 in the axial direction. An inner end 96 of the insertion layer 82 is disposed inwardly of the end PB of the bead 70 in the radial direction. A material of the insertion layer 82 is the same as the material of the insertion layer 22 of the tire 2 shown in FIG. 1.

In FIG. 4, a length represented by a double-headed arrow EA is a thickness of the sidewall 66 at the maximum width position PW.

In the tire 62, the thickness EA of the sidewall 66 at the maximum width position PW is not greater than 5.0 mm. In the tire 62, the side portion S is thin. The thin side portion S contributes to reduction of the mass and the rolling resistance of the tire 62.

In the tire 62, the insertion layer 82 between the carcass 72 and the inner liner 80 is disposed between the end of the belt 74 and the end PB of the bead 70. The volume resistivity of the insertion layer 82 is less than $10^8$ Ω·cm, and a complex elastic modulus E*s of the insertion layer 82 is equivalent to or higher than a complex elastic modulus E*n of the inner liner 80.

In the tire 62, the complex elastic modulus E*s of the insertion layer 82 is equivalent to or higher than the complex elastic modulus E*n of the inner liner 80, whereby the insertion layer 82 inhibits the inner liner 80 from moving due to pressing by a bladder. In the tire 62, intrusion of the inner liner 80 into the topping rubber is prevented. Also in a zone in which the topping rubber may be squeezed, the thickness of the topping rubber is ensured, so that the carcass 72 can function as a conductive path. The distance between the carcass cords is appropriately maintained without expanding, thereby reducing generation of a defect such as open thread. The insertion layer 82 is formed of crosslinked rubber having electric conductivity, similarly to the topping rubber. Therefore, even if intrusion of the insertion layer 82 into the topping rubber occurs, the carcass 72 can function as the conductive path.

Furthermore, since the complex elastic modulus E*s of the insertion layer 82 is equivalent to or higher than the complex elastic modulus E*n of the inner liner 80, the insertion layer 82 also contributes to assuredly obtaining stiffness of the tire 62. In the tire 62, although the side portion S is thin, good steering stability is obtained.

The tire 62 can reduce rolling resistance while reducing influence on electric conductivity and steering stability.

As described above, according to the present invention, a tire that can reduce rolling resistance while reducing influence on electric conductivity and steering stability can be obtained.

EXAMPLES

The present invention will be described below in more detail according to examples and the like. However, the present invention is not limited to only the examples and the like.

Example 1

A tire (tire size=205/55R16), for a passenger car, having the basic structure shown in FIG. 1 and having the specifications indicated below in Table 1 was obtained.

In example 1, no tie gum layer was provided. This is indicated as "N" in the cell for the tie gum layer in Table 1. The thickness EA of the sidewall at the maximum width position PW was 4.7 mm.

In example 1, the insertion layers were disposed between the carcass and the inner liner. The insertion layer was disposed between the end of the belt and the end of the bead. The insertion layer had a volume resistivity of $10^4$ Ω·cm, that is, less than $10^8$ Ω·cm. The overlapping length DS over which the belt and the insertion layer overlapped each other was 5 mm. The overlapping length DU over which the bead and the insertion layer overlapped each other was 10 mm. The insertion layer had a complex elastic modulus E*s of 4.0 MPa and a thickness is of 0.5 mm. The inner liner had a complex elastic modulus E*n of 3.5 MPa. A ratio (E*s/E*n) of the complex elastic modulus E*s of the insertion layer to the complex elastic modulus E*n was 1.1. The first step distance SV was set as 7.0 mm and the second step distance SB was set as 5.0 mm.

Comparative Example 1

Comparative example 1 was a conventional tire. Comparative example 1 had the same structure as example 1 except that a tie gum layer instead of the insertion layers was disposed between the carcass and the inner liner so as to be extended on and between both beads. The tie gum layer had a volume resistivity of $10^4$ Ω·cm. The thickness EA of the sidewall at the maximum width position PW was 5.7 mm "Y" in the cell for the tie gum layer in Table 1 indicates that the tie gum layer was provided.

Comparative Example 2

A tire of comparative example 2 was obtained in the same manner as in comparative example 1 except that no tie gum layer was provided, and the thickness EA of the sidewall at the maximum width position PW was 4.5 mm in comparative example 2.

Examples 2 to 3

Tires of examples 2 to 3 were each obtained in the same manner as in example 1 except that the overlapping length DS was as indicated below in Table 1.

Examples 4 to 6

Tires of examples 4 to 6 were each obtained in the same manner as in example 1 except that the complex elastic modulus E*s of the insertion layer was changed and the ratio (E*s/E*n) was as indicated below in Table 2.

Example 7

A tire (tire size=205/55R16), for a passenger car, having the basic structure shown in FIG. 4 and having the specifications indicated below in Table 2 was obtained.

In example 7, no tie gum layer was provided. The thickness EA of the sidewall at the maximum width position PW was 4.7 mm.

In example 7, the insertion layers were disposed between the carcass and the inner liner. The insertion layer was disposed between the end of the belt and the end of the bead. The insertion layer had a volume resistivity of $10^4$ Ω·cm, that is, less than $10^8$ Ω·cm. The overlapping length DS over which the belt and the insertion layer overlapped each other was 5 mm. The overlapping length DU over which the bead and the insertion layer overlapped each other was 10 mm. The insertion layer had a complex elastic modulus E*s of 4.0 MPa and a thickness is of 0.5 mm. The inner liner had a complex elastic modulus E*n of 3.5 MPa. A ratio (E*s/E*n) of the complex elastic modulus E*s of the insertion layer to the complex elastic modulus E*n was 1.1. The first step distance SV was set as 7.0 mm and the second step distance SB was set as 5.0 mm.

[Rolling Resistance (RRC)]

A rolling resistance tester was used to measure a rolling resistance coefficient (RRC) by performing running with each sample tire on a drum at a speed of 80 km/h under the following conditions. An amount of change from comparative example 1 serving as a reference was obtained. The results are indicated below in Tables 1 to 2. The less the value is, the greater the reduction of rolling resistance is.

Rim: 16×6.5 J

Internal pressure: 210 kPa

Vertical load: 4.8 kN

[Electric Conductivity]

Each tire was mounted on a rim (size=16×6.5 J), and was inflated with air to an internal pressure of 210 kPa. The rim was fixed to a stationary shaft of a resistance measuring unit to mount the tire to the resistance measuring unit. In the resistance measuring unit, the tire was placed on a metal plate mounted on an insulating plate (electric resistance value=not less than $10^{12}\Omega$). The tire was left in this state for two hours. Thereafter, a 5.3 kN vertical load was applied to the tire for 0.5 minutes. The application of the load was temporarily stopped, and a similar load was applied to the tire for 0.5 minutes. The application of the load was stopped again, and a similar load was further applied to the tire for two minutes. After 5 minutes passed since application of a test voltage (1000 V), a value of an electric resistance between the stationary shaft and the metal plate was measured. The measurement was performed at four portions of the tire at 90° intervals in the circumferential direction of the tire. An index for the result indicating that the electric resistance value was not greater than $10^{8}\Omega$ at each of the four portions was set to 100. The index for each example was indicated below in Tables 1 to 2. The greater the value is, the more excellent electric conductivity is. The measurement was conducted in an environment in which the temperature was 25° C. and the humidity was 50%. For the measurement, a mold release agent and dirt on the surface of the tire were fully removed in advance and the tire was fully dried.

[Defect Resistance]

50 sample tires were disassembled, and a zone from a portion near the end of the tread to the maximum width position was checked for occurrence of defects such as open thread and intrusion of the inner liner into the topping rubber. The defect resistance was evaluated based on a proportion of tires having no defect relative to the entirety. The results are indicated below as indexes in Tables 1 to 2. The greater the value is, the more excellent defect resistance is.

[Steering Stability]

The sample tire was mounted on a rim (size=16×6.5 J) and inflated with air to adjust an internal pressure of the tire to 230 kPa. The tires were mounted to all wheels of a rear-wheel-drive car (occupied by one person) as a test vehicle having an engine displacement of 2000 cc, and the vehicle was caused to run on a test course having a dry asphalt road surface. The driver made evaluation (sensory evaluation) for steering stability. The results are indicated below as indexes in Tables 1 to 2. The greater the value is, the more excellent steering stability is.

TABLE 1

| | Comparative example 1 | Comparative example 2 | Example 2 | Example 1 | Example 3 |
|---|---|---|---|---|---|
| Structure | — | — | FIG. 1 | FIG. 1 | FIG. 1 |
| Tie gum layer | Y | N | N | N | N |
| DS [mm] | — | — | 10 | 5 | 1 |
| DU [mm] | — | — | 10 | 10 | 10 |
| E*s [MPa] | — | — | 4.0 | 4.0 | 4.0 |
| ts [mm] | — | — | 0.5 | 0.5 | 0.5 |
| E*n [MPa] | 3.5 | 3.5 | 3.5 | 3.5 | 3.5 |
| E*s /E*n | — | — | 1.1 | 1.1 | 1.1 |
| RRC | — | −0.20 | −0.10 | −0.15 | −0.15 |
| Electric conductivity | 100 | 0 | 100 | 100 | 100 |
| Defect resistance | 100 | 50 | 100 | 100 | 100 |
| Steering stability | 100 | 80 | 100 | 100 | 98 |

TABLE 2

| | Example 4 | Example 5 | Example 6 | Example 7 |
|---|---|---|---|---|
| Structure | FIG. 1 | FIG. 1 | FIG. 1 | FIG. 4 |
| Tie gum layer | N | N | N | N |
| DS [mm] | 5 | 5 | 5 | 5 |
| DU [mm] | 10 | 10 | 10 | 10 |
| E*s [MPa] | 3.5 | 5.7 | 6.7 | 4.0 |
| ts [mm] | 0.5 | 0.5 | 0.5 | 0.5 |
| E*n [MPa] | 3.5 | 3.5 | 3.5 | 3.5 |
| E*s /E*n | 1.0 | 1.6 | 1.9 | 1.1 |
| RRC | −0.15 | −0.15 | −0.15 | −0.10 |
| Electric conductivity | 100 | 100 | 100 | 100 |
| Defect resistance | 98 | 100 | 100 | 100 |
| Steering stability | 98 | 110 | 110 | 100 |

As indicated in Tables 1 to 2, in the examples, rolling resistance was reduced while influence on electric conductivity and steering stability was reduced. The evaluation results clearly indicate that the present invention is superior.

The technique for reducing rolling resistance while reducing influence on electric conductivity and steering stability as described above is also applicable to various tires.

What is claimed is:

1. A tire comprising:

a tread coming into contact with a road surface;

a pair of sidewalls disposed inwardly of the tread in a radial direction so as to be continuous with ends of the tread;

a pair of beads disposed inwardly of the sidewalls in the radial direction, the pair of beads having ring-shaped cores;

a carcass extended on and between one of the beads and another of the beads so as to be disposed inwardly of the tread and the sidewalls;

a belt disposed between the tread and the carcass in the radial direction;

an inner liner disposed inwardly of the carcass; and a pair of insertion layers disposed between the carcass and the inner liner, wherein the carcass comprises a carcass ply, the carcass ply comprises a ply body extended on and between one of the cores and another of the cores, and a pair of turned-up portions continuous with the ply body so as to be turned up around the cores, respectively, from an inner side toward an outer side in an axial direction;

the insertion layers are each disposed between an end of the belt and an end of a corresponding one of the beads, the insertion layers each have a volume resistivity of less than $10^8$ Ω·cm, a complex elastic modulus of each insertion layer is equivalent to or higher than a complex elastic modulus of the inner liner, and a thickness of each sidewall at a maximum width position is not greater than 5.0 mm.

2. The tire according to claim 1, wherein a thickness of each insertion layer is not less than 0.2 mm and not greater than 1.0 mm.

3. The tire according to claim 1, wherein the complex elastic modulus of each insertion layer is not less than 4.0 MPa.

4. The tire according to claim 1, wherein an outer end of each insertion layer is disposed inwardly of the end of the belt in the axial direction, and wherein an overlapping length over which each insertion layer and the belt overlap each other is not greater than 20 mm.

5. The tire according to claim 1, wherein an inner end of each insertion layer is disposed inwardly of the end of a corresponding one of the beads in the radial direction.

6. The tire according to claim 1, wherein an end of each turned-up portion is disposed inwardly of the maximum width position in the radial direction.

7. The tire according to claim 1, wherein the carcass ply comprises multiple cords aligned with each other, and topping rubber covering the cords, and wherein a material of each insertion layer is the same as a material of the topping rubber.

8. The tire according to claim 1, wherein a ratio of the complex elastic modulus of each insertion layer to the complex elastic modulus of the inner liner is not greater than 4.9.

9. The tire according to claim 8, wherein a ratio of the complex elastic modulus of each insertion layer to the complex elastic modulus of the inner liner is not less than 1.1.

10. The tire according to claim 1, wherein the carcass comprises the one carcass ply, wherein each bead comprises an inner apex disposed outwardly of a corresponding one of the cores in the radial direction, and an outer apex disposed outwardly of the inner apex in the radial direction, wherein each turned-up portion is disposed between the outer apex and the inner apex, and wherein an outer end of the outer apex corresponds to the end of each bead.

11. The tire according to claim 10, wherein an inner end of each insertion layer is disposed inwardly of the end of a corresponding one of the beads in the radial direction.

12. The tire according to claim 10, wherein an end of each turned-up portion is disposed inwardly of the maximum width position in the radial direction.

13. The tire according to claim 10, wherein a height of the inner apex is not less than 5 mm and not greater than 20 mm.

14. The tire according to claim 10, wherein a ratio of a turned-up portion height to a cross-sectional height is not less than 0.18 and not greater than 0.25.

15. The tire according to claim 10, wherein an overlapping length over which each insertion layer and the belt overlap each other is not greater than 20 mm.

16. The tire according to claim 10, wherein an outer end of each insertion layer is disposed inwardly of the end of the belt in the axial direction, and wherein an overlapping length over which each insertion layer and the belt overlap each other is not greater than 30 mm.

17. The tire according to claim 16, wherein an overlapping length over which each insertion layer and the belt overlap each other is not greater than 20 mm.

18. A tire comprising:

a tread coming into contact with a road surface;

a pair of sidewalls disposed inwardly of the tread in a radial direction so as to be continuous with ends of the tread;

a pair of beads disposed inwardly of the sidewalls in the radial direction, the pair of beads having ring-shaped cores;

a carcass extended on and between one of the beads and another of the beads so as to be disposed inwardly of the tread and the sidewalls;

a belt disposed between the tread and the carcass in the radial direction;

an inner liner disposed inwardly of the carcass; and a pair of insertion layers disposed between the carcass and the inner liner, wherein the carcass comprises a carcass ply, the carcass ply comprises a ply body extended on and between one of the cores and another of the cores, and a pair of turned-up portions continuous with the ply body so as to be turned up around the cores, respectively, from an inner side toward an outer side in an axial direction;

the insertion layers are each disposed between an end of the belt and an end of a corresponding one of the beads, the insertion layers each have a volume resistivity of less than $10^8$ Ω·cm, a complex elastic modulus of each insertion layer is equivalent to or higher than a complex elastic modulus of the inner liner, and a thickness of each sidewall at a maximum width position is not greater than 5.0 mm, wherein a ratio of the complex elastic modulus of each insertion layer to the complex elastic modulus of the inner liner is not greater than 4.9 and not less than 1.1, wherein a thickness of each insertion layer is not less than 0.2 mm and not greater than 1.0 mm, wherein an outer end of each insertion layer is disposed inwardly of the end of the belt in the axial direction, and wherein an overlapping length over which each insertion layer and the belt overlap each other is not greater than 20 mm.

19. The tire according to claim 18, wherein an inner end of each insertion layer is disposed inwardly of the end of a corresponding one of the beads in the radial direction.

20. The tire according to claim 18, wherein an end of each turned-up portion is disposed inwardly of the maximum width position in the radial direction.

* * * * *